US006354693B1

(12) United States Patent
Looman et al.

(10) Patent No.: US 6,354,693 B1
(45) Date of Patent: Mar. 12, 2002

(54) PRINTING OF COLOR INK UNDER AND OVER BLACK TEXT AND GRAPHICS AREAS

(75) Inventors: Steven D Looman, Corvallis, OR (US); Mark H. Kowalski, Westford, MA (US); George C Ross, Philomath; Michel A. Riou, Milwaukie, both of OR (US); Paul David Gast, Camas; Brooke E Smith, Brush Prairie, both of WA (US); Keshava A Prasad, San Marcos, CA (US); Robert B McMaster, Vancouver, WA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/659,666

(22) Filed: Sep. 11, 2000

Related U.S. Application Data

(63) Continuation-in-part of application No. 09/273,703, filed on Mar. 22, 1999, now Pat. No. 6,244,687.

(51) Int. Cl.[7] .................................................. B41J 2/21
(52) U.S. Cl. ....................................................... 347/43
(58) Field of Search ............................. 347/43, 15, 12, 347/40, 41, 95, 96, 98, 100, 37; 358/1.9, 502; 100/31.33, 31.53

(56) References Cited

U.S. PATENT DOCUMENTS

| 4,967,203 A | 10/1990 | Doan ........................... 347/41 |
| 5,111,302 A | 5/1992 | Chan et al. .................. 358/298 |
| 5,168,552 A | 12/1992 | Vaughn et al. ................ 358/1.9 |
| 5,198,023 A | 3/1993 | Stoffel ..................... 106/31.32 |
| 5,302,197 A | 4/1994 | Wickramanayke et al. ...... 106/31.79 |
| 5,536,306 A | 7/1996 | Johnson et al. ........... 106/31.49 |
| 5,554,739 A | 9/1996 | Belmont ...................... 534/885 |
| 5,563,985 A | 10/1996 | Klassen et al. ............... 358/1.9 |
| 5,571,311 A | 11/1996 | Belmont et al. .......... 106/31.28 |
| 5,626,655 A | 5/1997 | Pawlowski et al. ....... 106/31.27 |
| 5,630,868 A | 5/1997 | Belmont et al. .......... 106/31.75 |
| 5,679,143 A | 10/1997 | Looman ................... 106/31.43 |
| 5,695,820 A | 12/1997 | Davis et al. ................. 427/261 |
| 5,700,317 A | 12/1997 | Adamic .................... 106/31.58 |
| 5,707,432 A | 1/1998 | Adams et al. .............. 106/31.6 |
| 5,723,179 A | 3/1998 | Wong et al. ................. 427/258 |
| 5,767,876 A * | 6/1998 | Koike et al. ................... 347/43 |
| 5,785,743 A | 7/1998 | Adamic et al. ........... 106/31.27 |
| 5,853,465 A | 12/1998 | Tsang et al. .............. 106/31.25 |
| 5,933,164 A * | 8/1999 | Sato et al. ...................... 347/43 |
| 6,158,834 A * | 12/2000 | Kato et al. ..................... 347/43 |
| 6,261,350 B1 * | 7/2001 | Kabalnov ................. 106/31.33 |
| 6,273,550 B1 * | 8/2001 | Brown ........................ 347/43 |

* cited by examiner

Primary Examiner—N. Le
Assistant Examiner—Lamson D. Nguyen

(57) ABSTRACT

One or more reactive color inks are printed under and over black text and graphics areas. That is to say, one or more reactive color inks are first printed in a selected area in which black text and/or graphics are to be printed, then the black text and/or graphics are printed, and finally one or more reactive color inks are then printed over the black text and/or graphics. The use of under- and over-printing of black text and/or graphics by reactive color inks improves several important characteristics of inkjet printing. Specifically, the following improvements are obtained: dry-time, finger smudge, media independence/print quality, waterfastness, strikethrough, less noticeable missing/misdirected nozzles, and no dedicated pens are required. Alternatively, either underprinting alone or overprinting alone may be used.

16 Claims, No Drawings

PRINTING OF COLOR INK UNDER AND OVER BLACK TEXT AND GRAPHICS AREAS

CROSS-REFERENCE TO RELATED APPLICATION

The present application is a continuation-in-part of application Ser. No. 09/273,703, filed Mar. 22, 1999, now U.S. Pat. No. 6,244,687.

TECHNICAL FIELD

The present invention relates generally to inkjet printing and, more particularly, to a printing technique for improving or fixing several attributes associated with inkjet printing.

BACKGROUND ART

As inkjet printing matured from black-only printing to include color printing (e.g., cyan, magenta, and yellow), a number of problems surfaced that had not been significant in black-only printing. Historically, the area of investigation expected to fix or improve upon many of these attributes has been black ink formulation. The following are areas typically controlled by black ink formulation and which have shown significant improvement with the implementation of this technology: media independence, area fill uniformity (mottle), dry time/throughput, finger smudge, optical density, and strikethrough (penetration of colorant to the nonprinted surface of the paper). Improvements to some of these attributes have been addressed through either printer hardware or writing systems development efforts. Some of the prior solutions are discussed below.

Dry time/throughput. Solutions here include decreasing the drop volume and inclusion of a heater or fuser into the printer. Decreasing the drop volume can significantly decrease dry times, but can lead to other architectural and logistical problems. Heaters or fusers can perform a similar function, but can be unattractive due to requirements of space, power consumption, and cost.

PQ (Print Quality). Management of drop placement, shape and variability are typical architectural and pen characteristics used to improve PQ. Improvements in these areas are extremely important, but are also very time consuming and costly. In addition, there is a limit to how much improvement may be achieved. Regardless, the benefits of this new technology are in addition to these solutions and are additive to the solutions already being utilized.

Masking missing or misdirected nozzles and banding. Multipass printing and various shingle masks have both been implemented to reduce the appearance of banding as well as missing, weak, or misdirected nozzles. The effectiveness of these techniques is limited by the ability to implement the correct shingle mask for all occasions as well as limiting within-printhead nozzle variations. These problems are inherently difficult to address due to the high contrast nature of misplaced black drops on a typically white background. Application of color ink under and over the black printed area reduces the background from white to a secondary color, significantly lowering contrast and rendering many defects much less obvious to the customer. In addition, the previous solutions should work in combination with the new under/over printing technology discussed herein.

Black ink reliability. Improvements to reliability have typically been left to ink development and further enhanced by complicated servicing algorithms. Limitations of this approach include constraining the black ink formulation space and the necessity of a highly functional and complex service station adding additional cost and limiting throughput.

Most solutions proposed for improving one or more of the foregoing attributes often result in degradation of other attributes. Accordingly, efforts continue to develop solutions to improving most, if not all, of the foregoing attributes without degradation of other attributes.

DISCLOSURE OF INVENTION

In accordance with the present invention, one or more reactive color inks are printed under and/or over black text and graphics areas. That is to say, a text or graphics area is first defined. Then, three different inks are applied to this area in various amounts in the following order: color, black, color. The use of under-and/or over-printing of black text and/or graphics by reactive color inks improves many important characteristics of inkjet printing. Specifically, improvements include, but are not limited to the following:

(1) Drytime: Printing the color ink underneath the black ink allows for faster black ink penetration into the substrate, thereby reducing the time to obtain dry areas of black ink. As a result of the faster dry time, throughput can be increased significantly without compromising finger smudge or blotting performance.

(2) Smudgefastness: This characteristic is related to the drytime of the ink. This is in reference to the amount of ink that is transferred when a user touches the printed area shortly after printing. An ink with a long drytime requires that the user wait for the ink vehicle to either absorb into the substrate or evaporate before handling the printout. Under/over printing shortens the drytime of the ink which allows a user to manipulate the printed pages sooner with a lower chance of smudging the printed page.

(3) Media Independence/Image Quality: Under/over printing can also enhance the quality of the printed image and black optical density. One disadvantage of inkjet printing is in that it can be very media sensitive. Certain papers react differently to inks due to variations in density, materials, fillers, and physical properties of the paper. These characteristics affect the rate of ink penetration and may be highly varied between paper types and even within a single sheet of paper. Some papers have a slow absorption rate, and the ink vehicle tends to remain on the paper surface until most of it has evaporated. Some papers cause the ink to penetrate unevenly into the page, resulting in a black area fill which appears nonuniform. Other papers tend to absorb ink quickly, leaving less for surface evaporation and resulting in low optical density. Under/over printing allows a more uniform and higher optical density area coverage across a wider paper set. Typically pigmented black inks containing relatively low surfactant levels and low organic contents have difficulty "wetting" paper surfaces. While these formulations may be necessary to obtain superior print quality, this can result in both slower dry times and nonuniform performance over even relatively small areas. The color ink used to underprint the black ink "wets" the page more effectively, allowing the black ink vehicle to absorb into the paper more quickly. At the same time, reactants in the color ink cause the black pigment particles to quickly destabilize or precipitate on the surface of the page. By keeping a higher percentage of the pigment particles on the surface of the paper, the black image is more uniform, more consistent, and has a higher optical density. At the same time, prewetting the paper surface allows for a faster dry time with all of the related benefits.

(4) Strikethrough: On certain media, black pigment penetrating the paper can be seen on the opposite side of the printed image. Small, concentrated, black points can be seen as a result of black ink penetrating through pores in the paper. Underprinting the black areas increases the rate of penetration of the black ink vehicle and increases the total amount of ink vehicle present, but precipitates a higher percentage of the pigment particles on the printed surface of the page. This reduces and in many cases eliminates the amount of small, black points that can be seen from the nonprinted side of the page.

(5) No dedicated pens required: Under/over printing can be accomplished with pen and ink sets currently available. In a proposed new inkjet printer, the pen order will be CKMY (cyan, black, magenta, yellow). This allows under/over printing on each pass of a bidirectional printmode. During any printed swath, one color can underprint while another overprints the black ink. In the reverse direction, the same color inks may be used, but with reversed roles. The amount of ink that is under/overprinted can be optimized to help control bidirectional hue shift caused by underprinting with the same color inks, but in a different order depending upon print direction. Specifically, black may be underprinted by cyan (or magenta) and overprinted by magenta (or cyan); placement of the black pen between cyan and magenta facilitates this printing scheme.

(6) Black Text and Graphics Quality: Text and graphics quality is improved simply by the increase in optical density. For text this effect is dramatic on some papers and negligible on others. For graphics, the effect can be even greater and for a larger variety of papers.

(7) Waterfastness: The mechanism by which shorter dry-time is achieved with underprinting also improves immediate waterfastness. The black vehicle penetrates more quickly and the pigment precipitates on the surface of the paper. Without this action more vehicle would be on the surface of the paper with pigment still stabilized and more mobile in solution. Since the vehicle has not had a chance to fully absorb, exposing the printed area to water could easily wash away the vehicle and pigment. Noticeable improvements in waterfastness from 0 to 5 minutes can be obtained. This improvement is dependent upon the choice of both ink and paper.

(8) Missing/Misdirected Nozzles: The ability to reduce visibility of print defects such as missing, weak, and/or misdirected nozzles is due to the decrease in contrast between the background of the printed area and the printed area itself. Because color ink is applied to the paper both under and over the black printed area, if a drop or small section of black drops is missing, misdirected, or smaller than expected, the background in that area makes it more difficult to observe. Due to the background in the black printed area now being a composite of two color inks a situation of much lower contrast between the printed area and the defect area exists. Due to the lower contrast, the defective area is significantly more difficult to observe.

BEST MODES FOR CARRYING OUT THE INVENTION

Few technologies have improved upon as many key issues of inkjet performance as much as the one discussed herein. Media independence with this technology could surpass by a significant margin all previous inkjet products. Under/over printing black ink with color ink allows the implementation of a reactive mechanism to occur in all black areas. This results in higher rates of pigment flocculation and a higher percentage of the black pigment remaining on the paper surface. This mechanism should be independent of media and allows for a dramatic improvement in optical density media independence resulting in improved print quality for text and especially graphics. Further improvements in media independence are a result of the higher surfactant load and types of surfactants utilized in the color ink. This allows more uniform coating of the paper surface and higher penetration rates leading to significant improvements in area fill uniformity (mottle), dry time, and throughput. As a result of the shorter dry times, there can also be significant improvement in other time-based attributes, such as finger smudge and waterfastness at very short times after printing.

Another area of improvement directly relatable to the customer is the potential for this technology to reduce print defects. Under and/or over printing black areas with color inks has the effect of reducing the contrast between the printed area and the paper substrate. As a result, isolated missing, weak, or misdirected nozzles become less evident. Similar effects may also be used to improve banding.

Other attributes showing improvement include halo and strikethrough. Halo can be caused by differences in surface tension between color and black inks. The lower surface tension color inks flood into the black printed area diluting the black colorant resulting in decreased optical density. This can be improved using under/over printing by reducing the surface tension difference at the interface between black and color inks as well as decreasing dry time. Strikethrough, the appearance of ink from the nonprinted side of the page, shows improvement under certain conditions enhancing duplexing performance.

In order for the under/overprinting technique to work, key characteristics of both color and black ink sets are required. In the typical inkjet vernacular, these are called reactive ink sets.

Generalized components of the color ink (CMY):
(1) colorant having a first charge;
(2) surfactant; and
(3) reactive component having a second and opposite charge.

General components of a black ink (K):
(1) pigment dispersant of opposite charge to the reactive species in the color ink; or
(2) self-dispersed particles of opposite charge to the reactive species in the color ink.

For color inks, the anionic colorants are typically sulfonated dye materials, although pigments are often used. Surfactants are usually chosen for their ability to minimize color to color bleed as well as improved coalescence performance on photo, glossy, or transparent media. Examples of surfactants that minimize color to color bleed include nonionic, ionic, and amphoteric surfactants having relatively low HLBs. U.S. Pat. No. 5,536,306, entitled "Thermal Ink-Jet Inks Having Reduced Black to Color and Color to Color Bleed", issued to Loren E. Johnson et al on Jul. 16, 1996, and assigned to the same assignee as the present application, discloses the use of primary surfactants that happen to have relatively low HLB (hydrophilic-lipophilic balance) values, namely, secondary alcohol ethoxylates such as Tergitol 15-S-5 and Tergitol 15-S-7, which are available from Union Carbide Co. of Houston, Tex. Tergitol 15-S-5 and Tergitol 15- S-7 have HLB values of about 10.5 and 12.1, respectively.

Examples of other surfactants that are successfully employed to control bleed in ink-jet ink compositions include the class of amine oxide surfactants, such as the following: N,N-dimethyl-N-dodecyl amine oxide (NDAO); N,N-dimethyl-N-tetradecyl amine oxide (NTAO); N,N-dimethyl-N-hexadecyl amine oxide (NHAO); N,N-dimethyl-N-octadecyl amine oxide (NOAO); and N,N-dimethyl-N-(9-octadecenyl) amine oxide (OOAO).

As disclosed in U.S. Pat. No. 5,626,655, entitled "Use of Co-Surfactants to Adjust Properties of Ink-Jet Inks", issued to Norman E. Pawlowski et al on May 6, 1997, and assigned to the same assignee as the present application, discloses a co-surfactant in combination with a surfactant. The co-surfactant component may be any surfactant having an HLB value that is at least 1.5 units higher than that of the primary surfactant, thereby countering the primary surfactant's tendency to partition more toward micelle formation and the resulting poor wetting characteristics. Examples of suitably employed co-surfactants include, but are not limited to, diphenyl disulfonate derivatives, which are anionic surfactants; certain secondary ethoxylated alcohols; and certain amine oxides. Specifically, examples of suitably-employed diphenyl sulfonate derivatives include, but are not limited to: (1) the Calfax family of surfactants, commercially available from Pilot Chemical; (2) Dowfax 8390, a sodium n-hexadecyl diphenyloxide disulfonate commercially available from Dow Chemical having an HLB value of about 14.4; and (3) Poly-Tergent 4 C3, a sodium hexadecyl diphenyl ether disulfonate commercially available from Olin Chemical having an HLB value of about 14.4. More specifically, suitable members of the Calfax family of surfactants include Calfax 16L-35, which is a sodium n-hexadecyl diphenyloxide disulfonate having an HLB of about 14.4, and Calfax 10L-45, which is a sodium n-decyl diphenyloxide disulfonate having an HLB of about 17.8.

Examples of secondary ethoxylated alcohols that may be suitably employed as a co-surfactant include, but are not limited to, Tergitols having at least 9 ethoxylated units, although a Tergitol surfactant having 7 ethoxylated units might slightly improve the wetting characteristics of Tergitol 15-S-5. The HLB value of a Tergitol is directly proportional to its number of ethoxylated units. Therefore, while surfactants in Union Carbide's Tergitol family with about 4 to 8 ethoxylated units have low HLB values, Tergitols having more than 9 ethoxylated units have HLB values reflecting at least a borderline solubility in water. The greater the number of ethoxylated units, such as Tergitol 15-S-30 with an HLB of about 18.0, the greater the solubility in water and the more useful the Tergitol is as a co-surfactant.

An example of a suitably-employed amine oxide surfactant as a co-surfactant is N-octyldecenyl-N,N-dimethlyamine oxide, which is commonly known as oleamine oxide and is commercially available from Henkel Corporation under the tradename Standamox 01. Another amine oxide surfactant that may suitably serve as a co-surfactant is dimethyl myristyl amine oxide.

It is important to note that the class of high HLB-type surfactants employed as co-surfactants is not limited to the above-mentioned diphenyl disulfonate derivatives, Tergitol series surfactants having at least 9 ethoxylated units, and specific amine oxides. Rather, any surfactant having an HLB reflecting some degree of water solubility is contemplated to be capable of serving as a co-surfactant in accordance with the invention. Again, there are approximately sixty (60) accepted classes of surfactants, each of which have surfactants of varying HLB values. Accordingly, it is contemplated that there are numerous surfactants having sufficiently high HLB values that may serve as a co-surfactant in the practice of the invention. Examples of additional classes of surfactants that are suitably employed as co-surfactants include betaines, sorbitan derivatives, sulfonated alkyls, sulfonated alcohols, sulfates of ethoxylated alcohols, and sulfates of ethoxylated alkyls.

Reactive cationic components may be inorganic salts, preferably, multi-valent cationic salts such as $Mg(NO_3)_2$ or $Ca(NO_3)_2$, or may be protons supplied by inorganic or organic acids, preferably succinic acid. Examples of such multi-valent cationic salts are disclosed in U.S. Pat. No. 5,198,023, issued to John L. Stoffel on Mar. 30, 1993, and assigned to the same assignee as the present application, and include divalent ions (e.g., $Ca^{2+}$ and $Mg^{2+}$) and trivalent ions (e.g., $Al^{3+}$ and $Fe^{3+}$). Other divalent and trivalent ions may also be used in the practice of the present invention, such as, but not limited to, $Zn^{2+}$, $B^{3+}$. Examples of inorganic and organic acids are disclosed in U.S. Pat. No. 5,679,143, issued Oct. 21, 1997, to Steven D. Looman and include polyacrylic acid, acetic acid, glycolic acid, malonic acid, malic acid, maleic acid, ascorbic acid, glutaric acid, fumaric acid, citric acid, tartaric acid, lactic acid, sulfonic acid, and ortho-phosphoric acid and derivatives thereof. See also U.S. Pat. No. 5,785,743, issued Jul. 28, 1998, to Raymond J. Adamic et al.

For pigmented inks, ionically charged dispersants such as those described in U.S. Pat. No. 5,302,197 are typically required to form a stable pigment dispersion, although the present invention is not limited to the specifically disclosed ionically charged dispersants.

Alternatively, ionically charged particles such as self-dispersing pigments are required. In this latter case, chemically-modified, water-dispersible pigments are used.

These chemical modifications impart water-dispersibility to the pigment precursors that encompass all organic pigments. Reference is made to U.S. Pat. Nos. 5,707,432; 5,630,868; 5,571,311; and 5,554,739 for a discussion of modified carbon black pigments and methods of attaching the functionalized groups, although the present invention is not limited to the specifically disclosed modified carbon black pigments and methods of attaching the functionalized groups.

Under/over printing is achieved by printing a layer of color ink, printing a layer of black ink over the first layer, and then applying another color layer over the black ink layer. A future product has the pens in the order CKMY, which allows cyan to be utilized for underprinting and magenta for overprinting in one print direction, and magenta for underprinting and cyan for overprinting in the opposite print direction. This allows for bidirectional printing using this technology. The first color layer wets the page. Once the black layer is printed, the black vehicle is drawn into the paper by the color ink. The pigment in the black ink reacts with agents in the color ink and precipitates before or during the penetration of the black ink into the paper. After the black ink layer has been printed, the next color layer is printed over top. This final layer allows for hue shift compensation due to underprinting with different colors in different print directions. In its current embodiment, both color inks and the black ink are applied to the page during the same swath of the carriage, although the present invention is not so limited.

While both underprinting and overprinting of the black ink are disclosed above, and are preferred, nevertheless, either underprinting alone or overprinting alone of the black ink may be performed. The best results, however, are obtained with the combination of both underprinting and overprinting.

There are a number of printmodes that may be suitably employed in the practice of the present invention. A number of printmodes have been investigated in the use of the present invention, and these are now discussed. However, it will be appreciated that the invention does not rely on a particular printmode, and thus is not limited to the particular printrmode selected. Selection of a particular printmode will be made based on the particular needs or results of a specific printer. With the foregoing in mind, examples of some printmodes include: (1) applying one or both inks designated for under/overprinting on one swath and putting the black ink down on the second swath; (2) putting part of the black ink down with all the under/overprinting on the first swath and the rest of black on a second swath; and (3) putting 1/xth the amount of under/overprinting and black down in each of the x swaths of a x-pass printmode. While most or all varieties of printmodes show at least some improvement, for the most benefit in the largest number of attributes, it appears that the 1-pass bidirectional printmode described above, where all the black and under/overprinting ink is applied within the same swath, is most useful.

Paper characteristics affect the rate and uniformity of ink penetration. Some papers have a slow absorption rate, and the ink vehicle tends to stay on top of the paper drying mostly through evaporation. Other papers tend to absorb ink quickly. This can result in the black ink penetrating into the page before adequate pigment flocculation can occur and may result in low optical density. Under/over printing allows a more uniform image across a wider paper set. The underprinted color ink "wets" the page more uniformly, allowing the black vehicle to absorb into the page more quickly and more uniformly. At the same time, reactants in the color ink cause the pigment particles to rapidly flocculate and precipitate on the surface of the page. Through more uniform penetration and keeping the pigment particles on the surface of the paper, the black image is uniform and typically exhibits higher optical density.

INDUSTRIAL APPLICABILITY

The combination of under/over printing using reactive color inks in combination with black ink is expected to find use in inkjet printing. Thus, there has been disclosed a printing scheme for improving most inkjet attributes, comprising under/over printing black ink with reactive color inks. It will be readily apparent to those skilled in this art that various changes and modifications of an obvious nature may be made, and all such changes and modifications are considered to fall within the scope of the appended claims.

What is claimed is:

1. A method of improving properties of print on a print medium by inkjet printing by an inkjet printer, the method comprising:
   (a) printing a black ink on said print medium; and
   (b) performing one of the following steps:
      (1) underprinting a first color ink on said medium prior to printing said black ink thereon; or
      (2) overprinting a second color ink on said black ink; or
      (3) underprinting said first color on said print medium, printing said black color on said first color, and overprinting said second color on said black ink,
   wherein said first color ink and said second color ink both contain:
      (a) at least one colorant having a first charge;
      (b) at least one surfactant; and
      (c) at least one reactive component having a second and opposite charge,
   and wherein said black ink contains:
      (a) at least one pigment dispersant of opposite charge to said reactive species in said color ink; or
      (b) self-dispersed particles of opposite charge to said reactive species in said color ink.

2. The method of claim 1 wherein said colorant is anionic, said reactive component is cationic, and either said pigment dispersant or said self-dispersed particles are anionic.

3. The method of claim 1 wherein said first and second colors are the same.

4. The method of claim 1 wherein said first and second colors are different.

5. The method of claim 1 wherein said first color and said second color are independently selected from the group consisting of cyan, yellow, and magenta.

6. The method of claim 1 wherein said first color is underprinted in a first swath, followed by printing said black ink, followed by overprinting said second color, then underprinting said second color in a second swath, followed by printing said black ink, followed by overprinting said first color, wherein said first and second swaths are printed perpendicular to print medium travel in said inkjet printer, said second swath being printed adjacent or overlapping said first swath.

7. The method of claim 6 wherein said first swath is printed in one direction and said second swath is printed in the opposite direction.

8. The method of claim 6 wherein both said first swath and said second swath are printed in the same direction.

9. The method of claim 1 wherein at least one colorant comprises an anionic dye selected from the group consisting of sulfonated dyes and carboxylated dyes.

10. The method of claim 1 wherein said at least one surfactant is one that minimizes color-to-color bleed as well as improved coalescence performance on photo, glossy, or transparent print media.

11. The method of claim 1 wherein said reactive component is a cationic inorganic salt.

12. The method of claim 11 wherein said reactive component is a multivalent inorganic salt.

13. The method of claim 12 wherein said multivalent inorganic salt is selected from the group consisting of $Mg^{2+}$, $Ca^{2+}$, $Al^{3+}$, and $Fe^{3+}$.

14. The method of claim 1 wherein said reactive component comprises protons supplied by an acid.

15. The method of claim 14 wherein said acid is selected from the group consisting of succinic acid, polyacrylic acid, acetic acid, glycolic acid, malonic acid, malic acid, maleic acid, ascorbic acid, glutaric acid, fumaric acid, citric acid, tartaric acid, lactic acid, sulfonic acid, and ortho-phosphoric acid and derivatives thereof.

16. Printed media prepared by printing ink from an inkjet printer onto said media according to the method of claim 1.

* * * * *